Dec. 10, 1957 F. GAZAN 2,815,598
LICENSE PLATE FRAME FOR AUTO VEHICLES
Filed Nov. 2, 1955

INVENTOR.
Frances Gazan
BY Louis Chayka
ATTORNEY

2,815,598
LICENSE PLATE FRAME FOR AUTO VEHICLES

Frances Gazan, Detroit, Mich.

Application November 2, 1955, Serial No. 544,436

4 Claims. (Cl. 40—125)

My improvement pertains to a frame of a type which is adapted to receive a license plate prior to being mounted with said plate upon a bracket which is ordinarily provided on auto vehicles for this purpose. As is well known, a license plate is ordinarily provided with holes or slots for application of bolts or similar fastening means whereby a license plate may be secured to its supporting bracket. Taking advantage of the above fact, I have devised a frame which has means for reception of a license plate but which itself is devoid of any slots or holes for application of the above-named bolts or similar fastening means. In accordance with my improvement, the frame and the plate form a unit, and as the plate is already provided with the necessary slots or holes for the purpose of being mounted on an auto vehicle, it is these holes or slots in the plate which are being utilized for the purpose of the mounting of the unit on the vehicle. Thus, in general, it is not the frame which supports the license plate, but it is the license plate which supports the frame.

A further object of my invention is to provide a frame in which the license plate may be secured against displacement quickly and easily by means of simple and already known auxiliary means.

I shall now describe my improvement with reference to the accompanying drawings in which.

Similar numerals refer to similar parts throughout the several views.

Figure 1:
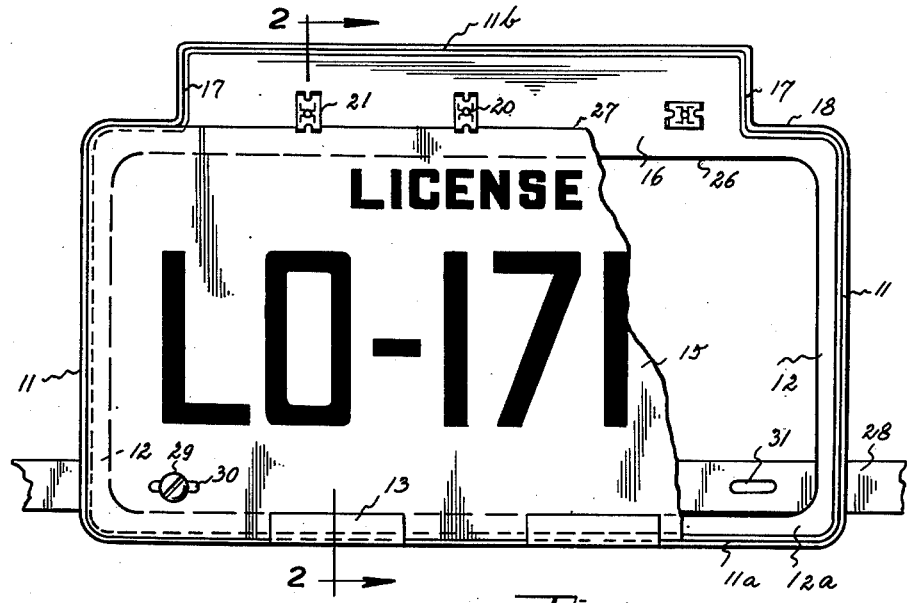
Fig. 1 is a front elevational view of my frame, the view including a license plate disposed therein, the plate being broken off in order to disclose its structural features and a part of a bracket on which the plate is supported.

The frame, preferably made of cast metal, is substantially rectangular in form and is made in such a manner that at each side, at the bottom, and at the top it includes a marginal bead or rail and a flat web or flange extending from the rail inwardly, the web and the rail, in cross-section, resembling a letter T. More specifically, the frame is defined by two parallel sides, each including a rail 11 and a web 12 which is in a plane parallel to that of the license plate which is to be disposed within said frame.

Similarly, the horizontal bottom member of the frame also includes a rail, marked 11a, and a web, marked 12a, but in addition thereto includes two integrally-formed bars 13, each of which is integrally connected to the web 12a in a spaced relation thereto. What is formed as a result of this structure are two ledges, each having a slot 14 for reception of the lower part of a license plate.

At the top the frame includes an expanded area of the web, the area being marked 16 and being defined at the top by a marginal rail 11b, which is shorter than the length of the frame, and by two vertical side members 17 of said rail. Each of the members 17 meets, at its lower end, a horizontal portion of the rail, marked 18 and leading up to the top portion of rail 11b. The area thus enclosed on three sides by rails 11b and 17, respectively, provides a space for advertising matter, such as the name and address of an automobile dealer.

Figure 2:
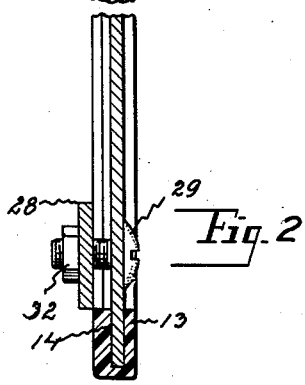
Fig. 2 is a vertical sectional view on line 2—2 of Fig. 1.
Figures 3, 4:
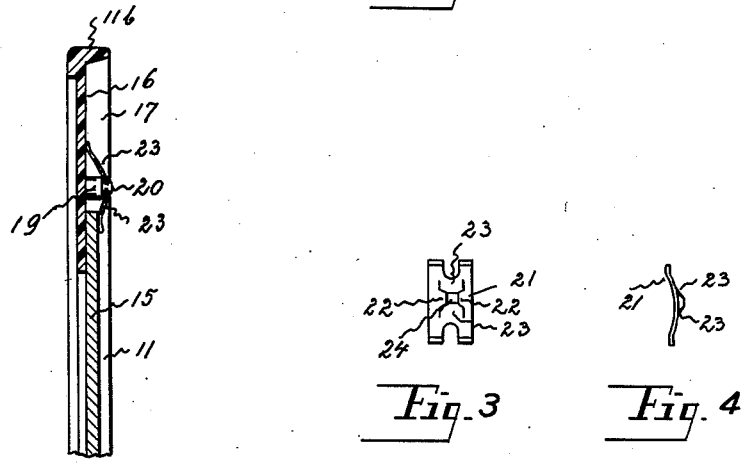
Fig. 3 is a plan elevational view of a locking fastener which is adapted to be used in conjunction with my frame.
Fig. 4 is an edge view of the same fastener.

It will be understood that the webs along all sides of the frame are in a plane recessed from the front portion of the rail, this being best shown in Fig. 2.

Extending forwardly from the web in said area 16 are a plurality of integrally-formed cylindrical projections 19, each terminating with an axially-extending pin 20, the pins of all projections being horizontally alined in a spaced relation to each other and to the inner rim 26 of the frame.

In conjunction with said pins, I am using for each of them a locking fastener 21 which is made of thin sheet steel stock. Each of the fasteners includes two pairs of opposed tongues, 22 and 23 respectively, the tongues converging towards a central opening 24. The outer ends of the tongues in each pair slant toward each other, as best shown in Fig. 2, so that a result thereof one broad face of the fastener has a dished-in appearance, with the hole 24 being in the center.

The manner in which the license plate is to be placed in the frame is as follows: The lower portion of the plate is first let into the slots 14 in said ledges 13. Thereupon, the upper portion of the plate is pressed against the lower portion of the web 16 when the upper rim 27 of the plate will reach up to a line below said pins 20, while the end portions of the plate will bear against the webs 12 at each side of the frame. Next, a fastener 21 is thrust over each pin, the concave face of the fastener being turned towards the plate, when the edges of the tongues 22 and 23, respectively, will come into a frictional contact with the pin 20. The fasteners are applied to said pins in such a position that one end of the fastener will bear against the plate 15 along its upper rim and will hold it in place. As the tongues of the fastener are bent at an angle outwardly from the plate, any movement of the plate away from the projections 19 would only serve to intensify the frictional grip of said tongues upon the respective pins.

When the license plate has been so secured within the frame, the frame with said plate, may be secured to a bracket 28 mounted on an auto vehicle by means of screws 29. These may be applied through slots 30 in the plate into slots 31 within said bracket 28. A nut 32 at the back of the bracket will serve to keep the screws against displacement.

After having described my improvement, what I wish to claim is as follows:

1. A one piece frame for an auto license plate, the frame including two parallel side members, a bottom member and a top member, each of the members comprising a marginal rail and a flat web set rearwardly of the front portion of the rail, the bottom member being provided with two ledges spaced from each other and slotted from above for reception of the lower rim portion of the plate, the web of the upper member being provided with a plurality of integrally formed pins projecting forwardly therefrom, the pins being spaced from each other along a line spaced from the lower rim of the web.

2. A one piece frame for an auto license plate, the frame including two parallel side members, a bottom member, and a top member, each of the members comprising a marginal rail and a flat web set rearwardly of the front portion of the rail, the bottom member being provided with two ledges spaced from each other and slotted from above for reception of the lower rim portion of the plate, the web of the upper member being provided with a plurality of integrally formed pins projecting forwardly therefrom, the pins being spaced from each other along a line spaced from the lower rim of the web, a fastener applicable to each pin for a frictional engagement therewith, the fastener being adapted to clamp the upper portion of a license plate held within the frame against the web of said upper member.

3. A substantially rectangular one piece frame for an auto license plate, the frame including two vertical side members, a bottom member, and a top member, all the members being integrally connected in end-to-end relation to each other, and each including a marginal rail and a flat web of uniform width extending from the rail inwardly in a plane parallel to the license plate to be disposed within said frame, the webs serving as a backing for the marginal portions of the plate, ledge means along the bottom member of the frame, the ledge means being slotted from above for reception of the lower rim portion of the plate, the web of the upper member of the frame being provided with a plurality of forwardly-projecting integrally formed pins spaced from each other and alined along the rim of the web, and a fastener applicable to each pin for a frictional engagement therewith, each fastener being adapted to clamp the upper portion of the license plate against the web of said upper member of the frame.

4. A one-piece frame for a vehicular license plate, the frame including two vertical side members, a horizontal bottom member, and a horizontal top member, the bottom member including a web recessed from the front portion of the frame, ledge means upon said lower member, the ledge means being slotted from above for reception of the lower rim portion of a license plate, the upper member of the frame including an expanded web area recessed from the front portion of the frame, a plurality of pins forwardly projecting from said web of the upper member, the pins being spaced from each other on a line spaced from the lower edge of the web, the web of the upper member and that of the lower member being in the same plane, and fastening members adapted to be applied to the pins for a frictional engagement therewith, the pins being adapted to clamp the plate against the web of said upper member below the line of said pins.

References Cited in the file of this patent
UNITED STATES PATENTS

| | | |
|---|---|---|
| D. 175,144 | Audette | July 19, 1955 |
| 762,419 | Lawson | June 14, 1904 |
| 994,464 | Hauck | June 16, 1911 |
| 1,421,548 | Pendergast et al. | July 4, 1922 |
| 1,519,575 | Davis | Dec. 16, 1925 |
| 1,798,526 | Fitzgerald | Mar. 31, 1931 |
| 1,887,087 | Frizner | Nov. 8, 1932 |